（12） United States Patent
Grinenval et al.

(10) Patent No.: US 10,240,933 B2
(45) Date of Patent: Mar. 26, 2019

(54) METHOD FOR GUIDING A VEHICLE AND A DRIVER ASSISTANCE SYSTEM

(75) Inventors: Charlotte Grinenval, Ludwigsburg (DE); Ulf Wilhelm, Rutesheim (DE); Wolfgang Schroeder, Markgroeningen (DE); Michael Knoop, Ludwigsburg (DE); Tobias Rentschler, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 302 days.

(21) Appl. No.: 14/352,452

(22) PCT Filed: Aug. 28, 2012

(86) PCT No.: PCT/EP2012/066695
§ 371 (c)(1),
(2), (4) Date: Sep. 30, 2014

(87) PCT Pub. No.: WO2013/060507
PCT Pub. Date: May 2, 2013

(65) Prior Publication Data
US 2015/0105936 A1 Apr. 16, 2015

(30) Foreign Application Priority Data

Oct. 27, 2011 (DE) .......... 10 2011 085 325

(51) Int. Cl.
*B60W 10/06* (2006.01)
*B60W 10/11* (2012.01)
(Continued)

(52) U.S. Cl.
CPC ............ *G01C 21/26* (2013.01); *B60W 10/06* (2013.01); *B60W 10/11* (2013.01);
(Continued)

(58) Field of Classification Search
None
See application file for complete search history.

(56) References Cited

U.S. PATENT DOCUMENTS 7,639,841 B2* 12/2009 Zhu .................. G06K 9/00335
340/435
7,885,766 B2* 2/2011 Sugimoto ............ G08G 1/167
701/26
(Continued)

FOREIGN PATENT DOCUMENTS

CN 101102916 A 1/2008
CN 101778753 A 7/2010
(Continued)

OTHER PUBLICATIONS

"Zukunft der Fahrerassistenz mit neuen E/E-Architekturen", (The Future of Driver Assistance With New E/E Architectures) ATZ Elektronik, Apr. 2011, pp. 8-15.

*Primary Examiner* — Rami Khatib
(74) *Attorney, Agent, or Firm* — Norton Rose Fulbright US LLP; Gerard Messina

(57) ABSTRACT

A method for guiding a vehicle, at least one parameter of the surroundings of the vehicle being detected by at least one sensor; a travel corridor being ascertained based on the parameter; a trajectory being ascertained as a function of at least one other parameter within the travel corridor; and the guidance of the vehicle being adapted as a function of the ascertained trajectory.

28 Claims, 3 Drawing Sheets

(51) Int. Cl.
  *B60W 10/20* (2006.01)
  *B60W 30/00* (2006.01)
  *B60W 30/10* (2006.01)
  *B62D 15/02* (2006.01)
  *G01C 21/26* (2006.01)
  *B60W 10/184* (2012.01)
  *B60W 30/095* (2012.01)

(52) U.S. Cl.
  CPC .......... *B60W 10/184* (2013.01); *B60W 10/20* (2013.01); *B60W 30/00* (2013.01); *B60W 30/095* (2013.01); *B60W 30/10* (2013.01); *B62D 15/025* (2013.01); *B60W 2520/10* (2013.01); *B60W 2520/105* (2013.01); *B60W 2520/125* (2013.01); *B60W 2540/10* (2013.01); *B60W 2550/10* (2013.01); *B60W 2550/141* (2013.01); *B60W 2550/145* (2013.01)

(56) References Cited

U.S. PATENT DOCUMENTS

| | | | | |
|---|---|---|---|---|
| 7,982,768 | B2 * | 7/2011 | Chien | B60R 1/00 348/148 |
| 8,027,762 | B2 * | 9/2011 | Otake | B60T 7/22 701/117 |
| 8,175,331 | B2 * | 5/2012 | Nagaoka | B60W 40/04 382/103 |
| 8,224,522 | B2 * | 7/2012 | Ikeda | B60W 50/14 340/995.1 |
| 8,447,484 | B2 * | 5/2013 | Saito | B60W 30/12 382/184 |
| 8,751,103 | B2 * | 6/2014 | Hukkeri | G01S 7/4815 701/25 |
| 8,755,983 | B2 * | 6/2014 | Ota | B60T 7/22 701/33.4 |
| 8,854,462 | B2 * | 10/2014 | Herbin | B60Q 9/00 340/435 |
| 9,031,743 | B2 * | 5/2015 | Okita | B60T 7/22 701/301 |
| 9,035,758 | B2 * | 5/2015 | Maass | B60Q 9/008 340/435 |
| 9,216,739 | B2 * | 12/2015 | Shibata | B60T 7/22 |
| 9,269,007 | B2 * | 2/2016 | Iguchi | G06K 9/00832 |
| 9,283,963 | B2 * | 3/2016 | Taner | B60W 30/18163 |
| 9,290,172 | B2 * | 3/2016 | Tsuchida | B60W 10/184 |
| 2005/0125121 | A1 * | 6/2005 | Isaji | B60W 30/08 701/36 |
| 2010/0121590 | A1 * | 5/2010 | Kato | B60L 11/14 702/63 |
| 2010/0145575 | A1 | 6/2010 | Switkes et al. | |
| 2011/0066308 | A1 * | 3/2011 | Yang | B60W 20/12 701/22 |
| 2011/0231062 | A1 | 9/2011 | Kim | |
| 2014/0081503 | A1 * | 3/2014 | Grossard | B60L 1/003 701/22 |

FOREIGN PATENT DOCUMENTS

| | | |
|---|---|---|
| CN | 102189993 A | 9/2011 |
| EP | 1 977 946 | 10/2008 |
| GB | 2 394 702 | 5/2004 |
| JP | H09-106500 A | 4/1997 |
| JP | 2002-059820 A | 2/2002 |
| JP | 2009176188 A | 8/2009 |
| JP | 2010155547 A | 7/2010 |
| JP | 2011016418 A | 1/2011 |
| WO | 03/094130 | 11/2003 |

* cited by examiner

US 10,240,933 B2

METHOD FOR GUIDING A VEHICLE AND A DRIVER ASSISTANCE SYSTEM

FIELD OF THE INVENTION

The present invention relates to a method for guiding a vehicle and a driver assistance system.

BACKGROUND INFORMATION

Different driver assistance systems are known from the related art, using which an assistance of the driving function of the vehicle and other functions of the vehicle are carried out, such as an automatic cruise control, a collision warning, a lane keeping assistant, a night vision camera having person recognition, a parking assistant for automatically parking the vehicle, and a lane change assistant for recognizing a vehicle in the blind spot. Different driver assistance systems are discussed in the article "Zukunft der Fahrerassistenz mit neuen E/E-Architekturen", ATZ Elektronik, April 2011, pages 8 through 15.

SUMMARY OF THE INVENTION

The object of the present invention is to provide an improved method for guiding a vehicle and an improved driver assistance system.

The object of the present invention is achieved by the method according to the description herein, and by the driver assistance system according to the description herein. Further advantageous specific embodiments of the present invention are indicated in the the further descriptions herein.

One advantage of the described method is that a travel corridor for guiding a vehicle is ascertained as a function of a surroundings parameter and that a trajectory, which is used to guide the vehicle, is ascertained as a function of another parameter within the travel corridor. In this way, an improved guidance of the vehicle is achieved, since the actual trajectory is ascertained in a two-stage method. First, a travel corridor is ascertained based on a surroundings parameter. The travel corridor is, however, usually wide enough for another refinement to be still possible as a function of another parameter. The trajectory to be actually travelled is now ascertained within the travel corridor as a function of the other parameter. It is thus possible to take into account other parameters in addition to the surroundings, i.e., the road width, the road curvature, and the traffic situation, for optimally establishing the trajectory.

In another specific embodiment, the other parameter is a parameter of the movement of the vehicle and/or an operating parameter of the engine of the vehicle and/or an operating parameter of a brake of the vehicle and/or an operating parameter of a steering of the vehicle and/or a driver's intent. Taking into account the movement of the vehicle makes it possible, for example, to optimize a transverse acceleration of the vehicle or a longitudinal acceleration of the vehicle. In addition, taking into account an operating parameter of the engine may enable an efficient utilization of the torque or fuel-efficient driving, for example. Furthermore, an optimized braking action may be achieved with the aid of a corresponding selection of the trajectory using an operating parameter of the brake. In addition, an optimized trajectory may be ascertained by taking into account the steering angle of the vehicle and/or the driver's intent. For example, it may be taken into account whether the driver requests a high or a low torque.

In another specific embodiment, an availability of an actuator of the vehicle and/or an actuating reserve of an actuator of the vehicle may be used as another operating parameter. In this way, it may be checked prior to establishing the trajectory whether the actual function of the vehicle, such as further braking, further acceleration, stronger steering of the vehicle, is at all possible.

In this way, the actual possibilities of the vehicle are taken into account when selecting the trajectory.

In another specific embodiment, the vehicle is guided along the ascertained trajectory with the aid of longitudinal control and/or transverse control.

In another specific embodiment, the trajectory is ascertained by taking into account a strategy, e.g., of a maximum comfort for the driver or a maximum dynamic of the vehicle movement. In this way, the trajectory may be adapted to the situation or to the individual needs of the driver.

In another specific embodiment, an evaluation function is provided which has an influence on the ascertainment of the trajectory as a function of the requirements of other functions of the vehicle. It is thus ensured that in addition to the guidance function of the vehicle, other functions of the vehicle are also taken into account. In an electric vehicle, an empty battery may, for example, require a different movement function than a fully charged battery.

In another specific embodiment, an interface is provided for outputting a piece of information to a driver and/or for inputting a piece of information by the driver. In this way, the driver may be informed about the selected trajectory. In addition, the driver may have an influence on the parameters and/or the selection of the trajectory. For example, the driver may predefine the desired strategy for ascertaining the trajectory via a corresponding input.

In another specific embodiment, a surroundings situation is ascertained based on a model and a situational analysis is carried out as a function of at least one operating parameter. The travel corridor is ascertained based on the situational analysis.

The present invention is elucidated below in greater detail with reference to the figures.

DETAILED DESCRIPTION

Figure 1:
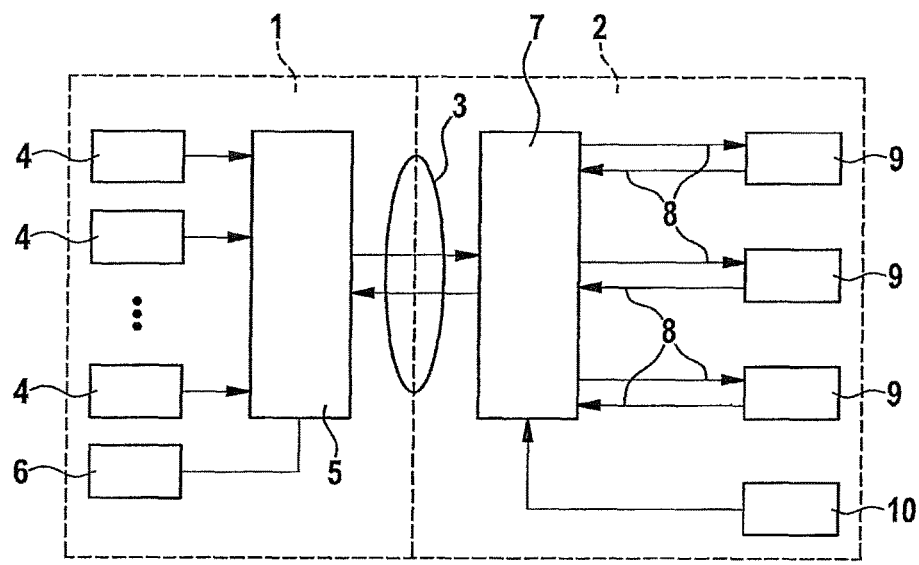
FIG. 1 shows a schematic illustration of a driver assistance system.

FIG. 1 shows in a schematic illustration a driver assistance system for guiding a vehicle. The guidance of a vehicle includes the vehicle guidance and the vehicle movement control. Both domains distinguish themselves by different types of tasks. The vehicle guidance includes a trajectory planning for a travel corridor having an anticipation horizon in an order of magnitude of, for example, 10 m to 100 m, which roughly corresponds to a time period of 1 second to 10 seconds. The vehicle movement control is concerned with setting the planned trajectory within the travel corridor in the sense of a control having an anticipation horizon in a range of <10 m, i.e., of anticipation times<1 s.

The difference between the tasks enables an organizational separation and the provision of an interface between the two domains of the driving task. It is therefore proposed to provide a function vehicle guidance 1 and a function vehicle movement control 2 which are interconnected via an interface 3, as shown in FIG. 1. Vehicle guidance 1 is connected to vehicle movement control 2 via interface 3, interface 3, however, being usable for all driver assistance functions. The travel corridor predefined by vehicle guidance 1 is used by vehicle movement control 2 in order to establish a concrete trajectory as a function of another parameter. Here, vehicle movement control 2 takes into account other boundary conditions with regard to a dynamics potential of the vehicle and to the actuating potentials of actuators of the vehicle. Vehicle guidance 1 is connected to multiple sensors 4 for detecting a parameter of the surroundings. Sensors 4 may, for example, be configured as radar sensors, video sensors, lidar sensors, and ultrasonic sensors. The signals of sensors 4 are transmitted to a first processing unit 5. The signals of sensors 4 are subjected to a signal processing, and a surroundings model is subsequently prepared with the aid of a model-based estimation. Here, surrounding objects, such as pedestrians, cyclists, car drivers, or also intersections, traffic lights, routing of roads, road width, traffic density, weather conditions, etc., are detected to model the surroundings. In addition, information of a digital map regarding the routing of the road, the traffic regulation, and other circumstances may be taken into account.

Subsequently, a situational analysis is carried out and action planning for establishing the travel corridor is carried out. As a function of the selected specific embodiment, parameters and criteria, in particular optimizing criteria, which, for example, result in particularly comfortable movement sequences or a particular dynamic, e.g., a high speed reduction, may already be considered when planning the travel corridor. Moreover, boundary conditions may be taken into account with regard to the vehicle dynamics potential, e.g., described by a friction value, and with regard to the actuating potentials of the actuators, e.g., described as an availability of the actuating systems and their actuating reserves. This information is transmitted in the form of a status feedback from vehicle movement control 2 to first processing unit 5. Vehicle guidance 1 is carried out, taking into account a vehicle guidance task, e.g., a longitudinal guidance of the vehicle to a predefined target, a transverse guidance of the vehicle within a roadway, or other inputs, e.g., a low-emission operation of the vehicle, a rapid reaching of a target point, a fuel-efficient operation of the vehicle, etc. These tasks are taken into account by first processing unit 5 during action planning. As a function of the selected specific embodiment, a second interface 6 may be provided via which vehicle guidance 1 and/or vehicle movement control 2 may output information to the driver or may obtain information from the driver. The information may be output visually, haptically and/or acoustically. The information may be input via a corresponding input arrangement, e.g., a touch screen.

First processing unit 5 is connected to a second processing unit 7 of vehicle movement control 2 via interface 3. Second processing unit 7 is connected to actuators 9 of the vehicle via signal and control lines 8. An actuator is understood to mean all types of controllable actuating systems, such as a braking system, an engine transmission, and a steering system of the vehicle. In addition, second processing unit 7 is connected to other sensors 10 which detect operating parameters of the vehicle, for example. For example, a speed sensor may be provided as another sensor 10. In addition, other sensor 10 may, for example, be configured as an acceleration sensor. Second interface 6 uses the predefined travel corridor to compute a trajectory and the setpoint values for the vehicle movement corresponding to the trajectory, taking into account the states of actuators 9 and of the other operating parameters of the vehicle. The setpoint values for the vehicle movement are compared to the actual values of the vehicle movement in the sense of a control. Control values for actuating systems 9 which lead to an implementation of the ascertained trajectory result from the comparison.

When computing the setpoint values for the vehicle movement, i.e., when ascertaining the trajectory, second interface 6, for example, takes into account a status and/or an actuating reserve of the at least one actuating system.

The proposed structure has the advantages that interface 3 is universal and may be used by different driver assistance functions. In addition, the structure offers free space for taking into account the present boundary conditions in vehicle movement control 2. Furthermore, there is task separation between vehicle guidance 1 and vehicle movement control 2.

Figure 2:
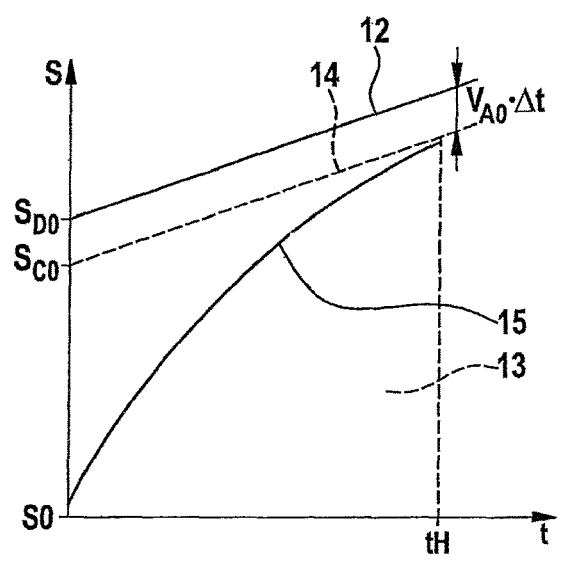
FIG. 2 shows a first driving situation.

FIG. 2 shows a diagram of a driving situation in which a longitudinal cruise control is carried out by the driver assistance system. The diagram shows time t, time t=0 corresponding to the presence and time t>0 illustrating an anticipation time pointing to the future. In addition, a distance s to a preceding vehicle is indicated. The position coordinates refer to a reference point in the vehicle, e.g., a center of the rear axle. Reference symbol s refers to the traveled arc length. At point in time t=0, the vehicle is at arc length s=0.

One exemplary embodiment for a purely longitudinal guidance is described in the following. FIG. 2 shows the available travel corridor for anticipation time tH. A trajectory of a preceding vehicle is illustrated in the form of a line 12 having starting point SD0. An automatic cruise control is provided as the driver assistance system. It is assumed that the preceding vehicle moves at a constant speed. The driver assistance system intends to set a distance which is predefined by a predefined time gap $\Delta t$. By subtracting the complete distance from the distance to preceding vehicle 12, the upper limit of corridor 13 is obtained. Corridor 13 for the movement of the vehicle is limited by setpoint distance 14 to the preceding vehicle. Setpoint distance 14 is established by predefined time gap $\Delta t$ and speed va0 of the preceding vehicle.

In the illustrated exemplary embodiment, setpoint distance 14 is also illustrated by a straight line which starts at point in time t=0 having arc length SC0. The time gap may, for example, be predefined by the driver or be preset. Travel corridor 13 illustrated in FIG. 2 is relayed from first processing unit 5 to second processing unit 7. Second processing unit 7 now ascertains a trajectory 15 within travel corridor 13 which is illustrated as a line. Here, second processing unit 7 takes into account predefined parameters and/or predefined states of actuating systems, as described above. In addition, the vehicle is controlled in such a way that the vehicle follows trajectory 15.

In principle, the travel corridor, i.e., the travelable space, may be characterized by different types of descriptions: predefining an area by path coordinates as a function of anticipation time t using path coordinates x, y or alternatively the distance from preceding vehicle s. Purely longitudinal functions may use arc length s against anticipation time t. In the case of purely transverse functions, the dependence against the anticipation time may be omitted. Here, the y coordinate is against the x coordinate. In addition, a central path through an arc length s may be used as a function of anticipation time t and curvature k may be used as a function of arc length s. Furthermore, a tolerance band may be indicated around the central path. This type of description is also scalable. Purely longitudinal functions use arc length s against time t. Purely transverse functions use curvature k against arc length s. In addition, functions combined from longitudinal and transverse functions may be used. Furthermore, a file having a maneuver catalog may be used in which a selection of predefined maneuvers is stored. A maneuver may be selected from the maneuver catalog and adapted to the present situation using the specific present parameters. In addition, a tolerance band around the predefined maneuver path may be indicated. The predefined maneuver is converted into a maneuver path with the aid of the present parameters of the instantaneous situation.

Figure 3:
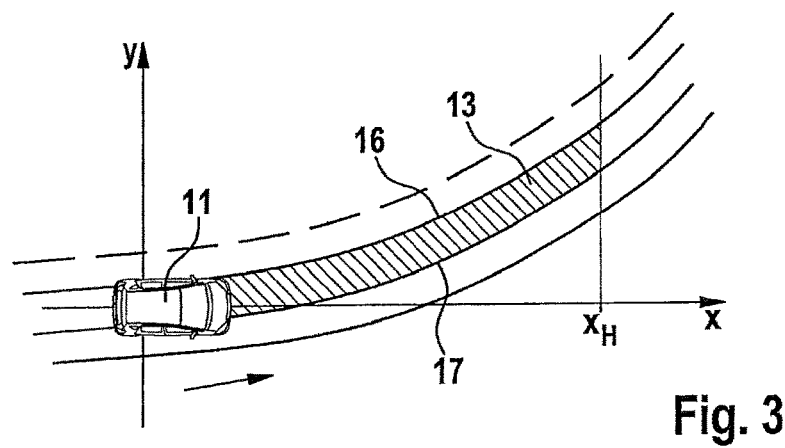
FIG. 3 shows a second driving situation.

FIG. 3 shows another specific embodiment in which a travel corridor 13 is used for a purely transverse guidance. FIG. 3 shows vehicle 11 in the x-y plane. Reference symbol x denotes the coordinate in the direction of the vehicle longitudinal axis. At point in time t=0, the vehicle is at x=0. Reference symbol y denotes the coordinate direction of the vehicle transverse axis. At point in time t=0, the vehicle is at y=0. FIG. 3 shows a transverse coordinate y against a longitudinal coordinate x up to an anticipation horizon xH. First processing unit 5 ascertains a travel corridor 13 which is between a left-hand corridor limit 16 and a right-hand corridor limit 17. Vehicle 11 moves along travel corridor 13 in the x direction. Travel corridor 13 may be described by spherical segments for left- and right-hand corridor limits 16, 17 using the parameters transverse offset, angle, and curvature. In addition, clothoid segments may be provided for left- and right-hand corridor limits 16, 17 using the parameters transverse offset, angle, and curvature, as well as change in curvature. In addition, left- and right-hand corridor limits 16, 17 may be established with the aid of coordinate points (x, y) between which corridor limits 16, 17 are interpolated.

Figure 4:
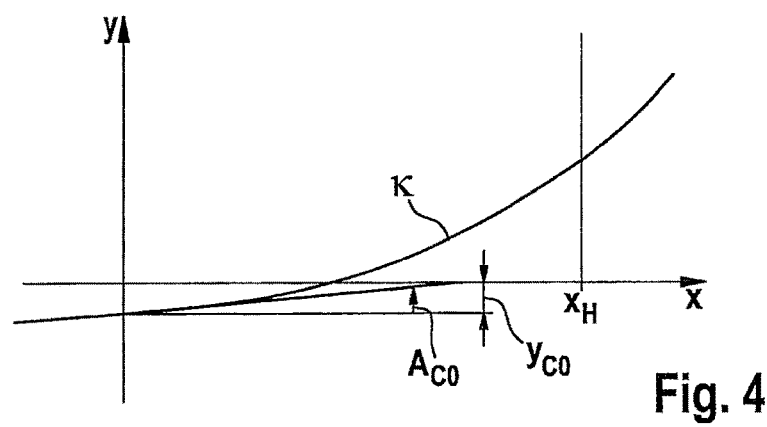
FIG. 4 shows a third driving situation.

FIG. 4 shows the description of a purely transverse left-hand corridor limit 16 as a spherical segment, having the following parameters: $y_{co}$: transverse offset of the limit relative to the reference point in vehicle 11, $A_{co}$: differential angle between the tangent and the longitudinal axis of the vehicle, k being the curvature of the left-hand coordinate limit, and xH being the anticipation horizon.

In another specific embodiment, in addition to transmitting the travel corridor to second processing unit 7, a strategy order may also be relayed to second processing unit 7. The strategy order may, for example, be established via a corresponding input by the driver or stored in a memory of the vehicle. A strategy order establishes what boundary condition vehicle movement control 2 must observe when planning the concrete trajectory within the travel corridor. Examples of such strategy orders are:

Optimization order, using which an optimization goal for the vehicle movement control is carried out. A maximization of the driving comfort or a maximization of the dynamic, i.e., maximum acceleration or maximum braking action, may be used as the optimization goal, for example.
Interaction Order Function-Driver Here, the driver may be warned about a critical situation via a just noticeable intervention into an actuating system of the vehicle, e.g., via a short braking jolt or via a small steering torque, the driver may continue to have sovereignty over the actuating system. In addition, the interaction function may not become active until the driver triggers the interaction function, for example, by operating the brake pedal or the steering wheel. Furthermore, the interaction function may be triggered automatically, the interaction function being active for a limited period of time unless the driver interrupts the interaction function before this time period elapses. In addition, the interaction function may be active for an unlimited period of time unless the driver assumes sovereignty over the vehicle movement beforehand.

Figure 5:
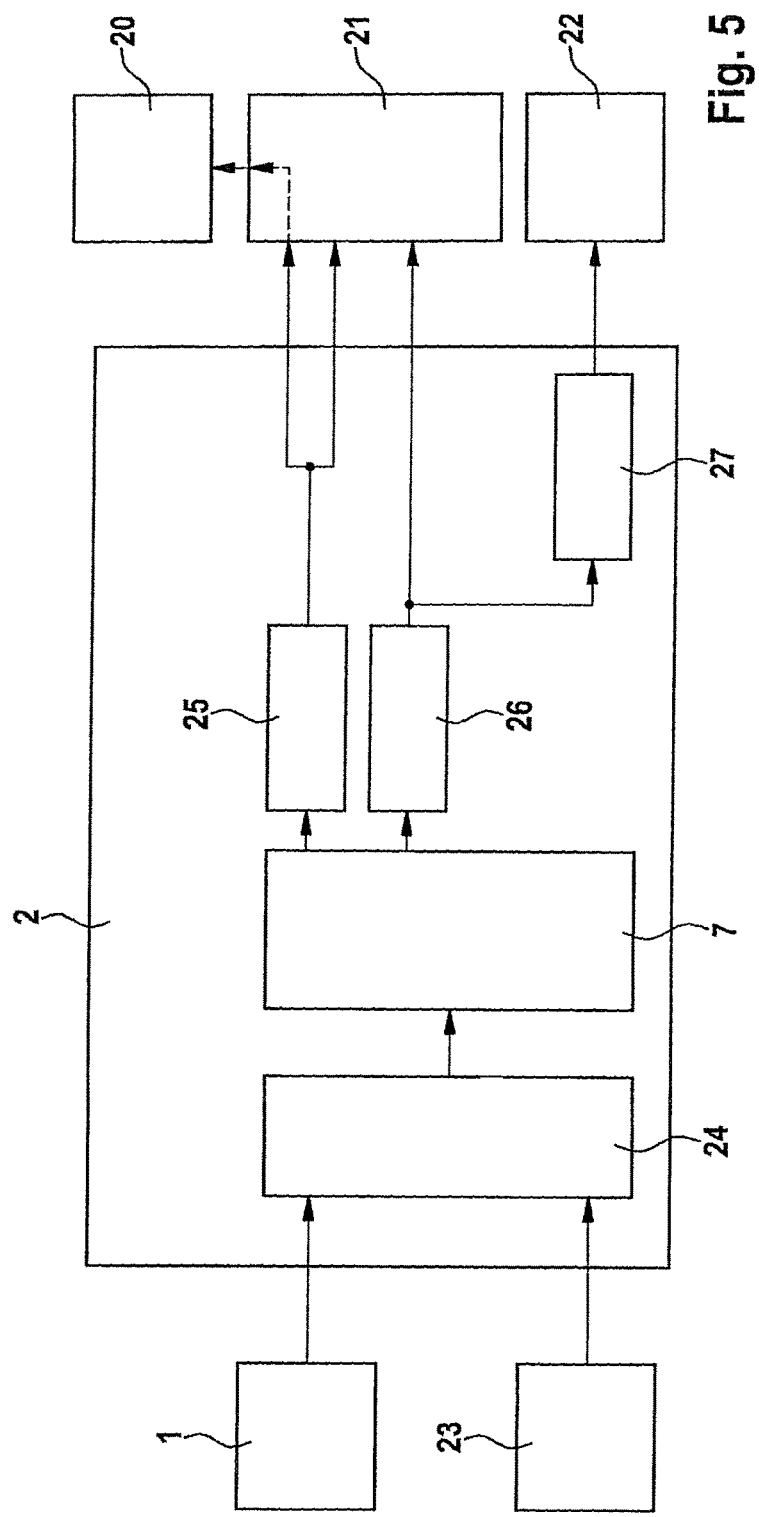
FIG. 5 shows a schematic configuration of a driver assistance system.

FIG. 5 shows in a schematic illustration an example of the configuration of vehicle control 2 using second processing unit 7. In the illustrated exemplary embodiment, a drivetrain (engine and transmission) 20 is activated for acceleration, an electronic stability program (ESP) 21 is activated for braking actions and interventions into the transverse dynamics via unilateral braking actions, and an electric power steering (EPS) 22 is activated for interventions into the steering torque. In the illustrated exemplary embodiment, requests from other function domains 23 may also be taken into account. To take into account other function domains 23, a decider 24 is provided which is also connected to vehicle guidance 1. Decider 24 decides as a function of established regulations whether vehicle guidance 1 or another domain is processed by second processing unit 7. As a function of the selected specific embodiment, it may be possible to omit decider 24, and vehicle guidance 1, as illustrated in FIG. 1, may be connected directly to second processing unit 7. This is for example the case when only driver assistance functions pose requests. Decider 24 is connected to second processing unit 7. Second processing unit 7 plans a concrete trajectory in the travel corridor, for example, according to a strategy order and/or a vehicle dynamics potential (friction value) and/or an actuating potential (availability and actuating reserve) of an actuating system. To obtain this trajectory, setpoint values of the vehicle movement variables, e.g., acceleration for the longitudinal movement and/or for the transverse movement, are ascertained. The setpoint values are compared to the present actual values. Control values which are, for example, supplied to a longitudinal controller 25 and a transverse controller 26 are ascertained from the comparison. Longitudinal controller 25 converts the control difference of the acceleration into activation values for drivetrain 20 and ESP 21 and relays these to ESP 21 and drivetrain 20. Transverse controller 26 ascertains activation values for the ESP (e.g., yaw torques via a unilateral brake intervention) from the control difference and the setpoint values and/or, via additional steering torque controller 27, activation values for the EPS in the form of a steering torque intervention via an electric power steering.

As a function of the selected specific embodiment, second processing unit 7 takes into account one optimizing criterion which may, for example, include the following criteria:

comfortable longitudinal movement and minimization of the longitudinal acceleration, etc.

$$\int_0^{t_H} a_x^2 dt \to \text{MIN}$$

where $a_x$ is the acceleration in the x direction and tH is the anticipation time, or minimization of the longitudinal jolt (time derivative of the longitudinal acceleration)

$$\int_0^{t_H} \dot{a}_x^2 dt \to \text{MIN}$$

where $\dot{a}_x$ is the derivative of the acceleration in the x direction and tH is the anticipation time,
comfortably transverse:
minimization of the transverse acceleration, $$\int_0^{xH} a_y^2 dx \to \text{MIN}$$

where $a_y$ is the acceleration in the y direction and xH is the anticipation horizon,
or of the transverse jolt (time derivative of the transverse acceleration)

$$\int_0^{xH} \dot{a}_y^2 dx \to \text{MIN}$$

where $\dot{a}_y$ is the time derivative of the acceleration in the y direction and xH is the anticipation horizon, comfortably combined:
minimization of the total acceleration, $$\int_0^{tH} (a_x^2 + a_y^2) dt \to \text{MIN}$$

or of the total jolt, $$\int_0^{tH} (\dot{a}_x^2 + \dot{a}_y^2) dt \to \text{MIN}$$

highly dynamically longitudinal:
maximization of the speed reduction, $$|\Delta v| = \left| \int_0^{tH} a_x dt \right| \to \text{MAX}$$

highly dynamically combined:
maximization of the speed reduction while predefining a transverse offset.

In addition to the illustrated optimization orders, an optimization with regard to the energy consumption, the exhaust gas emission, etc., may also be predefined.

What is claimed is:

1. A method, which directs a vehicle's movement, the method comprising:
   detecting at least one surroundings parameter by at least one sensor;
   ascertaining a travel corridor based at least on the surroundings parameter, wherein the travel corridor identifies a safe vehicle travel space, the travel corridor having boundaries that are different than and non-overlapping with roadway markings disposed on a road on which the vehicle is traveling, wherein the travel corridor has a length along the road in a direction of travel that represents a trajectory over which the vehicle is to travel, wherein the travel corridor is limited by a setpoint distance to a preceding vehicle;
   detecting at least one vehicle parameter, which defines a current operating condition of the vehicle, wherein the at least one vehicle parameter is at least one of:
      a current operating parameter of an engine of the vehicle,
      a current operating parameter of a brake of the vehicle, or
      a current operating parameter of a steering of the vehicle;
   determining a current availability of an actuating reserve of an actuator of the vehicle;
   setting the vehicle's trajectory within the travel corridor as a function of the detected at least one vehicle parameter, wherein the trajectory defines the vehicle's movement through the travel corridor, wherein the setting is performed based on the actuating reserve of the actuator being currently available and indicating that the actuator retains further actuating potential to increase a function of the actuator; and
   controlling the vehicle's movement based at least on the set trajectory at least by changing the at least one vehicle parameter.

2. The method of claim 1, wherein the controlling the vehicle's movement includes at least one of:
   a longitudinal control of the vehicle's movement; and
   a transverse control of the vehicle's movement.

3. The method of claim 1, wherein setting the vehicle's trajectory within the travel corridor is further based on at least one evaluation parameter, which identifies current limitations of the vehicle's resources at the time of the detecting.

4. The method of claim 3, wherein current limitations of the vehicle's resources include a current charge state of the vehicle's battery.

5. The method of claim 1, wherein an interface is provided, which receives input from a driver that defines at least one user predefined strategy order.

6. The method of claim 1, wherein the surroundings parameter is at least one of:
   a road width; a road curvature; road traffic; pedestrians; cyclists; car drivers; intersections; traffic lights; road routing; and weather conditions.

7. The method of claim 1, wherein the current availability of actuating reserve of an actuator of the vehicle is one of:
   an availability of increased acceleration as compared to the vehicle's current acceleration;
   an availability of increased steering as compared to the vehicle's current steering; and
   an availability of increased braking as compared to the vehicle's current braking.

8. The method of claim 1, wherein the at least one user predefined strategy order defines at least one of:
   an acceleration boundary;
   a braking action boundary;
   an emissions boundary;
   a fuel-efficiency boundary; and
   a time gap between the vehicle and a preceding vehicle boundary.

9. The method of claim 1, wherein the travel corridor includes an anticipation horizon.

10. The method of claim 9, wherein the anticipation horizon is less than 10 m.

11. The method of claim 1, wherein:
   the travel corridor has a left corridor limit and a right corridor limit, and
   the left and right corridor limits have a curvature that corresponds to a curvature of the road.

12. The method of claim 1, wherein setting the vehicle's trajectory within the travel corridor is further based on at least one user predefined strategy order.

13. The method of claim 1, wherein the setpoint distance is established by a predefined time gap and a speed of the preceding vehicle.

14. The method of claim 1, wherein the setting of the vehicle's trajectory is optimized by minimizing a longitudinal jolt corresponding to a time derivative of a longitudinal acceleration of the vehicle.

15. The method of claim 1, wherein the setting of the vehicle's trajectory is optimized by minimizing a transverse jolt corresponding to a time derivative of a transverse acceleration of the vehicle.

16. The method of claim 1, wherein the setting of the vehicle's trajectory is optimized by minimizing at least one of a longitudinal acceleration and a transverse acceleration of the vehicle.

17. The method of claim 1, wherein a left-hand corridor limit of the travel corridor is a spherical segment that has as parameters: a transverse offset of a limit relative to a reference point in the vehicle, and a differential angle between a tangent to the spherical segment and a longitudinal axis of the vehicle.

18. A driver assistance system, comprising:
    a first processing unit, which adapts a vehicle's movement, by performing the following:
        receiving at least one surroundings parameter from at least one sensor;
        ascertaining a travel corridor based at least on the surroundings parameter, wherein the travel corridor identifies a safe vehicle travel space, the travel corridor having boundaries that are different than and non-overlapping with roadway markings disposed on a road on which the vehicle is traveling, wherein the travel corridor has a length along the road in a direction of travel that represents a trajectory over which the vehicle is to travel, wherein the travel corridor is limited by a setpoint distance to a preceding vehicle;
    a second processing unit, which adapts variables of a vehicle's movement, by performing the following:
        receiving at least one vehicle parameter from another sensor, wherein the at least vehicle parameter defines a current operating condition of the vehicle, wherein the at least one vehicle parameter is at least one of:
            a current operating parameter of an engine of the vehicle,
            a current operating parameter of a brake of the vehicle, or
            a current operating parameter of a steering of the vehicle;
        determining a current availability of an actuating reserve of an actuator of the vehicle;
        setting the vehicle's trajectory within the travel corridor as a function of the detected at least one vehicle parameter, wherein the trajectory defines the vehicle's movement through the travel corridor, wherein the setting is performed based on the actuating reserve of the actuator being currently available and indicating that the actuator retains further actuating potential to increase a function of the actuator; and
        controlling the vehicle's movement based at least on the set trajectory at least by changing the at least one vehicle parameter.

19. The driver assistance system of claim 18, wherein the first processing unit performs a vehicle guidance task which ascertains the travel corridor; and
    the second processing unit performs a vehicle control task which sets the vehicle's trajectory and which controls the vehicle's movement through the travel corridor,
    wherein the first processing unit is connected to the second processing unit via an interface.

20. The driver assistance system of claim 18, wherein the travel corridor includes an anticipation horizon.

21. The driver assistance system of claim 20, wherein the anticipation horizon is less than 10 m.

22. The driver assistance system of claim 18, wherein:
    the travel corridor has a left corridor limit and a right corridor limit, and
    the left and right corridor limits have a curvature that corresponds to a curvature of the road.

23. The driver assistance system of claim 18, wherein setting the vehicle's trajectory within the travel corridor is further based on at least one user predefined strategy order.

24. The driver assistance system of claim 18, wherein the setpoint distance is established by a predefined time gap and a speed of the preceding vehicle.

25. The driver assistance system of claim 18, wherein the setting of the vehicle's trajectory is optimized by minimizing a longitudinal jolt corresponding to a time derivative of a longitudinal acceleration of the vehicle.

26. The driver assistance system of claim 18, wherein the setting of the vehicle's trajectory is optimized by minimizing a transverse jolt corresponding to a time derivative of a transverse acceleration of the vehicle.

27. The driver assistance system of claim 18, wherein the setting of the vehicle's trajectory is optimized by minimizing at least one of a longitudinal acceleration and a transverse acceleration of the vehicle.

28. The driver assistance system of claim 18, wherein a left-hand corridor limit of the travel corridor is a spherical segment that has as parameters: a transverse offset of a limit relative to a reference point in the vehicle, and a differential angle between a tangent to the spherical segment and a longitudinal axis of the vehicle.

* * * * *